United States Patent
Marzolla et al.

(10) Patent No.: US 10,040,881 B2
(45) Date of Patent: Aug. 7, 2018

(54) MULTILAYER METALLIZED FILMS

(71) Applicant: BASELL POLIOLEFINE ITALIA S.R.L., Milan (IT)

(72) Inventors: Roberta Marzolla, Ferrara (IT); Tiziana Caputo, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 128 days.

(21) Appl. No.: 15/103,203

(22) PCT Filed: Oct. 27, 2014

(86) PCT No.: PCT/EP2014/072985
§ 371 (c)(1),
(2) Date: Jun. 9, 2016

(87) PCT Pub. No.: WO2015/086213
PCT Pub. Date: Jun. 18, 2015

(65) Prior Publication Data
US 2016/0319058 A1 Nov. 3, 2016

(30) Foreign Application Priority Data

Dec. 9, 2013 (EP) .................................... 13196265

(51) Int. Cl.
| | |
|---|---|
| *B32B 27/32* | (2006.01) |
| *C08F 210/06* | (2006.01) |
| *C08F 210/16* | (2006.01) |
| *C08J 5/18* | (2006.01) |

(52) U.S. Cl.
CPC ............ *C08F 210/06* (2013.01); *B32B 27/32* (2013.01); *C08F 210/16* (2013.01); *C08J 5/18* (2013.01); *C08J 2323/14* (2013.01)

(58) Field of Classification Search
None
See application file for complete search history.

(56) References Cited

U.S. PATENT DOCUMENTS

| | | |
|---|---|---|
| 5,538,804 A | 7/1996 | Ogale |
| 5,922,471 A | 7/1999 | Chatterjee |
| 6,221,984 B1 | 4/2001 | Kersting et al. |
| 2005/0197456 A1 | 9/2005 | Nicolini et al. |
| 2008/0188622 A1 | 8/2008 | Nozawa |
| 2009/0075104 A1* | 3/2009 | Tornatore ................ B32B 27/32 428/461 |
| 2010/0137505 A1 | 6/2010 | Cavalieri et al. |

FOREIGN PATENT DOCUMENTS

| | | |
|---|---|---|
| CN | 1172123 A | 2/1998 |
| CN | 101255256 A | 9/2008 |
| EP | 1941997 A1 | 7/2008 |
| EP | 2666793 A1 | 11/2013 |
| JP | H07233221 A | 9/1995 |
| JP | 2007517122 A | 6/2007 |
| JP | 2010535863 A | 11/2010 |
| KR | 100210322 B1 | 7/1999 |
| KR | 20030027760 A | 4/2003 |
| WO | WO-9858971 A1 | 12/1998 |
| WO | WO-2013083576 A1 | 6/2013 |
| WO | WO-2013174778 A1 | 11/2013 |

OTHER PUBLICATIONS

PCT International Search Report and Written Opinion dated Jan. 26, 2015 (dated Jan. 26, 2015).

* cited by examiner

*Primary Examiner* — Sheeba Ahmed

(57) ABSTRACT

The present disclosure relates to a propylene ethylene 1-butene terpolymer wherein:
(i) the content of ethylene derived units ranges from 1.1 wt % to 1.9 wt %,
(ii) the content of 1-butene ranges from 5.0 wt % to 9.0 wt %,
(iii) the melting point (Tm) of the non-nucleated terpolymer ranges from 125° C. to 137° C.; and
(iv) the xylene soluble fraction at 25° C. is lower than 8.0 wt %.

8 Claims, No Drawings

MULTILAYER METALLIZED FILMS

FIELD OF THE INVENTION

The present disclosure relates to propylene terpolymerscapable of producing films such as cast films, bi- or mono-oriented films, heat-sealable films and metalized films having good optical properties and excellent sealing properties combined with good shrinkage properties and softness.

BACKGROUND OF THE INVENTION

Propylene copolymers or terpolymers are commercially used because, with respect to propylene homopolymers, they are often characterized by greater impact resistance, lower rigidity, and better transparency. However, it may be difficult to find an acceptable balance between those properties, particularly when the properties contrast each other. When a certain softness is desired, for example, it may obtained in the presence of a high amount of xylene soluble fractions that make the resulting polymers unsuitable for food contact applications.

Metalized films such as aluminum films have been widely used for their superior decorative properties, gas barrier properties and light-shielding properties.

WO 2003/037981 discloses pipes made from a polypropylene composition obtained by a process carried out in a reactor comprising two interconnected polymerization zones.

The process provides polypropylene compositions with high stiffness and impact resistance suitable for pipes, wherein the propylene composition is a propylene-ethylene-butene-1 terpolymer with an ethylene content ranging from 2-5 wt %.

WO 2009/019169 discloses a propylene ethylene 1-butene terpolymer obtained by a process carried out in a reactor comprising two interconnected polymerization zones. This terpolymer has a xylene soluble fraction higher than 9 wt % and a comonomer content higher than 8 wt %. In particular, when the ethylene content is lower than 2.5 wt % the 1-butene content is higher than 10 wt %. The terpolymers disclosed therein are characterized by a melting temperature $T_m$ higher than or equal to $(28.013X+120.5)°$ C., where X is the value of the weight ratio of ethylene content to the $C_4$-$C_8$ alpha-olefins content.

SUMMARY OF THE INVENTION

The present disclosure generally relates to a propylene ethylene 1-butene terpolymer having a certain amount of comonomer and obtained by a polymerization process carried out in a reactor, comprising two interconnected polymerization zones that can be advantageously used as a sealing layer in the metalized cast films.

In some embodiments, a propylene ethylene 1-butene terpolymer is provided, wherein:
(i) the content of ethylene derived units ranges from 1.1 wt % to 1.9 wt %, such as from 1.2 wt % to 1.8 wt % and from 1.3 wt % to 1.7 wt %;
(ii) the content of 1-butene ranges from 5.0 wt % to 9.0 wt %, including from 6.0 wt % to 8.5 wt % and from 6.5 wt % to 8.0 wt %;
(iii) the melting point (Tm) of the non-nucleated terpolymer ranges from 125° C. to 137° C.; such as from 130° C. to 135° C.; and
(iv) the xylene soluble fraction at 25° C. is lower than 7.5 wt %; including lower than 6.5 wt % and lower than 5.5 wt %.

DETAILED DESCRIPTION OF THE INVENTION

In some embodiments, the terpolymer of the present disclosure are characterized by a low sealing initiation temperature (SIT) and a high difference between the melting point and the SIT. Furthermore, particular features of the terpolymer of the present disclosure advantageously restrict-migration to the surface of oligomers and additives present in a film comprising with the terpolymer.

In certain embodiments, these features render the terpolymer particularly suitable as a sealing layer in a metallized multilayer film.

The terpolymer of the present disclosure can be prepared by polymerizing propylene ethylene and 1-butene in the presence of one or more Ziegler-Natta catalysts. An essential component of these catalysts is a solid catalyst component comprising a titanium compound having at least one titanium-halogen bond, and an electron-donor compound, both supported on a magnesium halide in active form. Another essential component is an organoaluminum co-catalyst compound, such as an aluminum alkyl compound. An external donor is optionally added.

Catalysts having the above mentioned characteristics are well known in the patent literature and include the catalysts described in U.S. Pat. No. 4,399,054 and European Patent No. 45977. Other examples can be found in U.S. Pat. No. 4,472,524.

In some embodiments, the solid catalyst components used in the catalysts comprise, as electron-donors (internal donors), compounds selected from the group consisting of ethers, ketones, lactones, compounds containing N, P and/or S atoms, and esters of mono- and dicarboxylic acids.

In certain embodiments, the electron-donor compounds are esters of phtalic acid and 1,3-diethers of the general formulas:

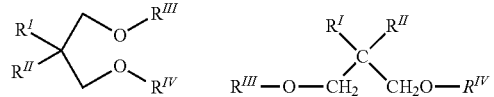

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three sites of unsaturation (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in European Patent Applications 361493 and 728769.

Representative examples of diethers for use in the present disclosure are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis(methoxymethyl)fluorene.

Other suitable electron-donor compounds are phthalic acid esters, such as diisobutyl, dioctyl, diphenyl and benzylbutyl phthalate.

The preparation of the above mentioned catalyst components is carried out according to various methods known to those of skill in the art.

For example, in some embodiments a $MgCl_2 \cdot nROH$ adduct (such as those in the form of spheroidal particles), wherein n is generally from 1 to 3 and ROH is ethanol, butanol or isobutanol, is reacted with an excess of $TiCl_4$ containing the electron-donor compound. In certain embodiments, the reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have been removed.

In the solid catalyst component the titanium compound, expressed as Ti, may be present in an amount from 0.5 to 10° by weight. The quantity of electron-donor compound which remains fixed on the solid catalyst component may comprise 5 to 20% by moles with respect to the magnesium dihalide.

The titanium compounds, which can be used for the preparation of the solid catalyst component, are the halides and the halogen alcoholates of titanium such as titanium tetrachloride.

The reactions described above produce a magnesium halide in active form. Other reactions are known in the literature that produce magnesium halide in active form from magnesium compounds other than halides, such as magnesium carboxylates.

The Al-alkyl compounds used as co-catalysts may comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio is in a range from 1 to 1000.

The electron-donor compounds that can be used as external donors include aromatic acid esters such as alkyl benzoates, and silicon compounds containing at least one Si—OR bond, where R is a hydrocarbon radical.

Examples of silicon compounds for use in the present technology are $(tert\text{-}butyl)_2Si(OCH_3)_2$, $(cyclohexyl)(methyl)Si(OCH_3)_2$, $(cyclopentyl)_2Si(OCH_3)_2$ and $(phenyl)_2Si(OCH_3)_2$ and $(1,1,2\text{-}trimethylpropyl)Si(OCH_3)_3$.

1,3-diethers having the formulas described above can also be used in the present technology. If the internal donor is one of these diethers, the external donors can be omitted.

In some embodiments, even if additional combinations of the catalyst components are capable of producing the propylene polymer compositions according to the present disclosure, the terpolymers may be prepared by using catalysts containing a phthalate as an internal donor and $(cyclopentyl)_2Si(OCH_3)_2$ as an external donor, or alternatively the 1,3-diethers as internal donors.

In certain embodiments, the propylene-ethylene-1-butene terpolymers described above may be produced by a polymerizationpolymerization process carried out in at least two interconnected polymerizationpolymerization zones.

The aforementioned process is illustrated in EP Patent Application 782 587.

In some embodiments, the process comprises feeding monomers to polymerization zones in the presence of a catalyst under reaction conditions and collecting the polymer product from the polymerization zones. The growing polymer particles may flow upward through one (first) of the polymerization zones (riser) under fast fluidization conditions, leave the riser and enter another (second) polymerization zone (downcomer), through which they flow downward in a densified form under the action of gravity, leave the downcomer and are reintroduced into the riser, thus establishing a circulation of polymer between the riser and the downcomer.

In the downcomer, high values of density of the solid are reached, which may approach the bulk density of the polymer. A positive gain in pressure can thus be obtained along the direction of flow, so that it becomes possible to reintroduce the polymer into the riser without the help of additional mechanical means. In this way, a "loop" circulation is established, which is defined by the balance of pressures between the two polymerization zones and by the head loss introduced into the system.

In some embodiments, the condition of fast fluidization in the riser is established by feeding a gas mixture comprising the relevant monomers to the riser. In certain embodiments, the feeding of the gas mixture is effected below the point of reintroduction of the polymer into the riser by the use, where appropriate, of gas distributor means. The velocity of transport gas into the riser may higher than the transport velocity under the operating conditions, such as from 2 to 15 m/s.

Generally, the polymer and the gaseous mixture leaving the riser are conveyed to a solid/gas separation zone. The solid/gas separation process can be regulated by using conventional separation means. From the separation zone, the polymer may enter the downcomer. The gaseous mixture leaving the separation zone may be compressed, cooled and transferred, if appropriate, with the addition of "make-up" monomers and/or molecular weight regulators, to the riser. The transfer can be regulated by means of a recycle line for the gaseous mixture.

The control of the polymer circulating between the two polymerization zones can be regulated by metering the amount of polymer leaving the downcomer using means suitable for controlling the flow of solids, such as mechanical valves.

The operating parameters, such as the temperature, are those that are usual in olefin polymerization process, for example a temperature between 50 to 120° C.

This first stage process can be carried out under operating pressures of between 0.5 and 10 MPa, such as between 1.5 to 6 MPa.

Advantageously, one or more inert gases may be maintained in the polymerization zones in such quantities that the sum of the partial pressure of the inert gases is, in some embodiments, between 5 and 80% of the total pressure of the gases. The inert gas can be nitrogen or propane, for example.

In order to obtain the terpolymers of the present disclosure, in certain embodiments no barrier feed is used between the two interconnected polymerization zones.

The various catalysts may be fed up to the riser at any point of the said riser. However, they can also be fed at any point along the downcomer. The catalyst can be in any physical state; therefore, catalysts in either the solid or liquid state can be used.

In some embodiments, the propylene terpolymer of the present disclosure is further endowed with one or more of the following features:
- a melt flow rate (MFR) (ISO 1133 230° C., 2.16 kg) ranging from 3 to 20 g/10 min; such as from 5 to 10 g/10 min; and
- a low sealing initiation temperature (SIT) ranging from 98 to 120° C.; including from 105 to 115° C.

In some embodiments, the terpolymer of the present disclosure may be used for film applications such as cast films and oriented films, BOPP films, heat-sealable films and all related film applications requiring heat sealability and softness. The propylene terpolymers described herein have a good balance between optical properties and sealing properties that is advantageously combined with good shrinkage properties and softness.

In some embodiments, the terpolymer of the present disclosure is beneficial for use in metalized cast film applications. The terpolymer of the present disclosure may further be used as an improved sealant layer of a metallized cast film comprising a metalized layer and a sealant layer.

In further embodiments of the present disclosure, a metalized film such as a metalized cast film comprising at least one metallized layer and one sealant layer, wherein the sealant layer comprises the terpolymer of the present disclosure, is contemplated.

The propylene terpolymers of the present disclosure can optionally further comprise at least one nucleating agent. In some embodiments, the propylene terpolymers comprise up to 2500 ppm, such as from 200 to 2000 ppm, of at least one nucleating agent.

The nucleating agent(s) can be selected from among inorganic additives such as talc, silica or kaolin, salts of monocarboxylic or polycarboxylic acids, e.g. sodium benzoate or aluminum tert-butylbenzoate, dibenzylidenesorbitol or its $C_1$-$C_8$-alkyl-substituted derivatives such as methyl-dibenzylidenesorbitol, ethyldibenzylidenesorbitol or dimethyldibenzylidenesorbitol or salts of diesters of phosphoric acid, e.g. 2,2'-methylenebis(4,6,-di-tert-butylphenyl)phosphate sodium or lithium salt. Additional nucleating agents for use in the present technology include 3,4-dimethyldibenzylidenesorbitol; aluminum-hydroxy-bis[2,2'-methylene-bis(4,6-di-t-butylphenyl)phosphate]; sodium 2,2'-methylene-bis(4,6-ditertbutylphenyl)phosphate and bicyclo[2.2.1]heptane-2,3-dicarboxylic acid, disodium salt (1R,2R,3R, 4S), HPN-20E that contains zinc compounds and 1,2-ciclohexanedicarboxylic acid calcium salt. The nucleating agent(s) may be added to the propylene terpolymer by known methods, such as by melt blending the nucleating agent(s) and the propylene terpolymer under shear conditions in a conventional extruder.

The propylene terpolymers produced in accordance with the present disclosure may comprise additional additives commonly employed in polyolefins, such as antioxidants, light stabilizers, antacids, antiblockers, colorants and fillers.

EXAMPLES

The following characterization methods were used in testing the propylene terpolymers produced according to the present disclosure.

Determination of the Comonomer Content:

The comonomer content was been determined by infrared (IR) spectroscopy by collecting the IR spectrum of the sample vs. an air background with a Fourier Transform Infrared spectrometer (FTIR), using the instrument data acquisition parameters:

purge time: 30 seconds minimum;
collect time: 3 minutes minimum;
apodization: Happ-Genzel; and
resolution: 2 $cm^{-1}$.

Sample Preparation:

Using a hydraulic press, a thick sheet is obtained by pressing about 1 gram (g) of sample between two aluminum foil sheets. If the homogeneity of the resulting sample is in question, a minimum of two pressing operations are recommended. A small portion is cut from the resulting sheet to mold a film. The recommended film thickness ranges between 0.02-0.05 cm (8-20 mils).

The pressing temperature is 180±10° C. (356° F.) and 10 $kg/cm^2$ (142.2 PSI) of pressure is applied for about one minute, after which the sample is removed and cooled to room temperature.

The spectrum of a pressed film of the polymer is recorded in absorbance vs. wavenumbers ($cm^{-1}$). The following measurements are used to calculate ethylene and 1-butene content:

Area ($A_t$) of the combination absorption bands between 4482 and 3950 $cm^{-1}$, which is used for determining the spectrometric normalization of film thickness.

Area ($A_{C2}$) of the absorption band between 750-700 $cm^{-1}$ after two proper, consecutive spectroscopic subtractions of an isotactic, non-additive polypropylene spectrum, followed by a reference spectrum of a 1-butene-propylene random copolymer in the range of 800-690 $cm^{-1}$.

Height ($D_{C4}$) of the absorption band at 769 $cm^{-1}$ (maximum value), after two proper consecutive spectroscopic subtractions of an isotactic, non-additive polypropylene spectrum and then of a reference spectrum of an ethylene-propylene random copolymer in the range of 800-690 $cm^{-1}$.

In order to calculate the ethylene and 1-butene content calibration straights lines for ethylene and 1-butene obtained by using samples of known amount of ethylene and 1-butene are needed:

Calibration of Ethylene:

Calibration straight line is obtained by plotting $A_{C2}/A_t$ versus ethylene molar percent (% C2m). The slope $G_{C2}$ is calculated from a linear regression.

Calibration of 1-Butene

A calibration straight line is obtained by plotting $D_{C4}/A_t$ versus butene molar percent (% C4m). The slope $G_{C4}$ is calculated from a linear regression.

Spectrum of the unknown sample is recorded and then ($A_t$), ($A_{C2}$) and ($D_{C4}$) of the unknown sample are calculated. The ethylene content (% molar fraction C2m) of the sample is calculated as follows:

$$\%C2m = \frac{1}{G_{C2}} \cdot \frac{A_{C2}}{A_t}$$

The 1-butene content (% molar fraction C4m) of the sample is calculated as follows:

$$\%C4m = \frac{1}{G_{C4}} \cdot \left(\frac{A_{C4}}{A_t} - I_{C4}\right)$$

The propylene content (molar fraction C3m) is calculated as follows:

$$C3m = 100 - \% C4m - \% C2m$$

The ethylene, 1-butene contents by weight are calculated as follows:

$$\%C2wt = 100 \cdot \frac{28 \cdot C2m}{(56 \cdot C4m + 42 \cdot C3m + 28 \cdot C2m)}$$

$$\%C4wt = 100 \cdot \frac{56 \cdot C4m}{(56 \cdot C4m + 42 \cdot C3m + 28 \cdot C2m)}$$

Solubility in xylene: 2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. The percent by weight of polymer soluble and insoluble at room temperature (25° C.) may then be determined.

Melt Flow Rate (MFR): Determined according to ISO 1133 (230° C., 2.16 kg).

Melting temperature and crystallization temperature: Determined by differential scanning calorimetry (DSC). weighting 6±1 mg, is heated to 220±1° C. at a rate of 20° C./min and kept at 220 □1° C. for 2 minutes in nitrogen stream and it is thereafter cooled at a rate of 20° C./min to 40±2° C., and kept at this temperature for 2 min to crystallize the sample. The sample is again fused at a temperature rise rate of 20° C./min up to 220° C.±1. The melting scan is recorded, a thermogram is obtained, and, from this measurement, the melting and crystallization temperatures are determined.

Preparation of the Cast Film Specimens

Films with a thickness of 50 μm were prepared by extruding each polymer composition in a single screw Collin extruder (length/diameter ratio of screw: 25) at a film drawing speed of 7 m/min and a melt temperature of 210-280° C.

Sealing Initiation Temperature (SIT.):
Determined as Follows.
Preparation of the Film Specimens Some films with a thickness of 50 μm are prepared by extruding each test composition in a single screw Collin extruder (length/diameter ratio of screw: 25) at a film drawing speed of 7 m/min, a melt temperature of 210-280° C. and a chill roll temperature from 10-20° C. Each resulting film is superimposed on a 1000 μm thick film of a propylene homopolymer having an isotacticity index of 97 and a MFR L of 2 g/10 min. The superimposed films are bonded to each other in a Carver press at 200° C. under a 9000 kg load, which is maintained for 5 minutes.

The resulting laminates are stretched longitudinally and transversally, i.e. biaxially, by a factor of six with a Bruckner Maschinenbau Karo IV film stretcher at 150° C. for obtaining a 20 μm thick film (18 μm homopolymer+2 μm test composition).

2×5 cm specimens are then cut from the films.
Determination of the SIT

For each test, two of the above described specimens are superimposed in alignment, with the adjacent layers being layers of the particular test composition. The superimposed specimens are sealed along one of the 5 cm sides with a Brugger Feinmechanik Model HSG-ETK 745 sealer. The sealing time was 0.5 seconds at a pressure of 0.1 N/mm². The sealing temperature was increased for each seal, starting from about 10° C. less than the melting temperature of the test composition. The sealed samples were left to cool and then their unsealed ends were attached to an Instron machine where they are tested at a traction speed of 50 mm/min.

The SIT is the minimum sealing temperature at which the seal does not break when a load of 2 Newtons (N) was applied in the test conditions.

Example 1 and Comparative Example 2

Propylene terpolymers were prepared by polymerizing propylene, ethylene and butene-1 in the presence of a highly stereospecific Ziegler-Natta catalyst.

The Ziegler-Natta catalyst was prepared according to Example 5, lines 48-55 of the European Patent No. EP728769. Triethylaluminum (TEA) was used as a co-catalyst and dicyclopentyldimethoxysilane as an external donor, with the weight ratios indicated in Table 1. The catalyst system was then transferred into a reactor containing an excess of liquid propylene and propane to carry out pre-polymerization at 25° C. for 11 minutes before introducing it into a polymerization reactor.

The propylene terpolymers of the examples were prepared in a single gas-phase polymerization reactor comprising two interconnected polymerization zones, a riser and a down-comer, as described in the European Patent No. EP782587 and WIPO Pat. App. Pub. No. WO00/02929.

The propylene terpolymers were produced in the polymerization ractor by feeding a continuous and constant flow of the pre-polymerized catalyst system, hydrogen (used as molecular weight regulator), propylene, ethylene and butene-1 in the gas state (the feeding quantities expressed in mol % are shown in Table 1).

The other operative conditions are indicated in Table 1.

The polymer particles exiting from the polymerization step were subjected to a steam treatment to remove the unreacted monomers and then dried. The characteristics of the polymer are reported in Table 2.

TABLE 1

|  | Ex. 1 | Comp. Ex. 2 |
|---|---|---|
| PRECONTACT |  |  |
| Temperature, ° C. | 15 | 15 |
| Residence time, min | 11 | 12 |
| Catalyst, g/h | 8 | 10 |
| TEA/CAT, g/g | 5 | 4 |
| TEA/Ext. Donor, g/g | 4 | 4 |
| PRE-POLYMERIZATION |  |  |
| Temperature, ° C. | 20 | 20 |
| Residence time, min | 6 | 6 |
| POLYMERIZATION |  |  |
| Temperature, ° C. | 72 | 71 |
| Pressure, barg | 23 | 21 |
| C3-, mole % | 68 | 61 |
| C2-, mole % | 1 | 0.8 |
| C4-, mole % | 7.5 | 10 |
| $H_2/C_3^-$, mol ratio | 0.06 | 0.07 |

TABLE 2

| EXAMPLE |  | 1 | Comp. 2 |
|---|---|---|---|
| Melt Index | g/10 min | 6.7 | 7.4 |
| Ethylene content | Wt % | 1.5 | 0.9 |

TABLE 2-continued

| EXAMPLE | | 1 | Comp. 2 |
|---|---|---|---|
| 1-butene content | Wt % | 7.4 | 10.5 |
| Xylene solubles at 25° C. | Wt % | 4.8 | 6.7 |
| Melting point | ° C. | 134 | 131 |

The cast film of the polymers of Example 1 and Comparative Example 2 were produced as described above. The cast films were metallized by depositing aluminum under vacuum and then sealed on the non-metallized side. The migration of the obtained films was checked and is described in Table 3.

TABLE 3

| Ex. | 1 | Comp. 2 |
|---|---|---|
| SIT ° C. | 111 | 109 |
| Migration in line | NO | YES |
| Migration after VM | NO | YES |

VM = vacuum metallization

From Table 3 it is clear that by using the terpolymer of the present disclosure it is possible to produce an improved metallized film without deleterious migration effects and without detrimental effects on the sealing properties.

What is claimed is:

1. A propylene/ethylene/1-butene terpolymer comprising:
   (i) 1.1-1.9 wt % ethylene,
   (ii) 5.0-9.0 wt % 1-butene,
   (iii) a melting point ($T_m$) of 125-137° C.; and
   (iv) a xylene soluble fraction at 25° C. lower than 8.0 wt %.

2. The propylene/ethylene/1-butene terpolymer of claim 1, wherein:
   (i) the content of ethylene derived units ranges from 1.2 wt % to 1.8 wt %; and
   (ii) the content of 1-butene ranges from 6.0 wt % to 8.5 wt %.

3. A film comprising the propylene/ethylene/1-butene terpolymer of claim 1.

4. A metallized film comprising at least one metallized layer and one sealant layer wherein the sealant layer comprises the propylene/ethylene/1-butene terpolymer of claim 1.

5. The terpolymer of claim 1, further comprising an additive selected from the group consisting of an antioxidant, light stabilizer, antacid, antiblocker, colorant and filler.

6. The terpolymer of claim 1, further comprising a nucleating agent selected from the group consisting of talc, silica, kaolin, and a carboxylic acid salt.

7. The terpolymer of claim 1, comprising a melt flow rate (MFR; ISO 1133; 230° C., 2.16 kg) of 3-20 g/10 min.

8. The terpolymer of claim 1, comprising a melt flow rate (MFR; ISO 1133; 230° C., 2.16 kg) of 5-10 g/10 min.

* * * * *

UNITED STATES PATENT AND TRADEMARK OFFICE
CERTIFICATE OF CORRECTION

PATENT NO. : 10,040,881 B2
APPLICATION NO. : 15/103203
DATED : August 7, 2018
INVENTOR(S) : Marzolla et al.

It is certified that error appears in the above-identified patent and that said Letters Patent is hereby corrected as shown below:

In the Specification

In Column 1, Line 3, after "MULTILAYER METALLIZED FILMS" insert -- This application is the U.S. National Phase of PCT International Application PCT/EP2014/072985, filed October 27, 2014, claiming benefit of priority to European Patent Application No. 13196265.6, filed December 9, 2013, the contents of which are incorporated herein by reference in its entirety. --

In Column 3, Line 28, delete "10°" and insert -- 10% --

In Column 3, Line 67, delete "polymerizationpolymerization" and insert -- "polymerization" --

In Column 4, Line 2, delete "polymerizationpolymerization" and insert -- polymerization --

In Column 8, Line 28, delete "ractor" and insert -- reactor --

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*